Feb. 13, 1923.
J. B. MELTZ.
CASTER.
FILED JUNE 27, 1921.
1,445,027
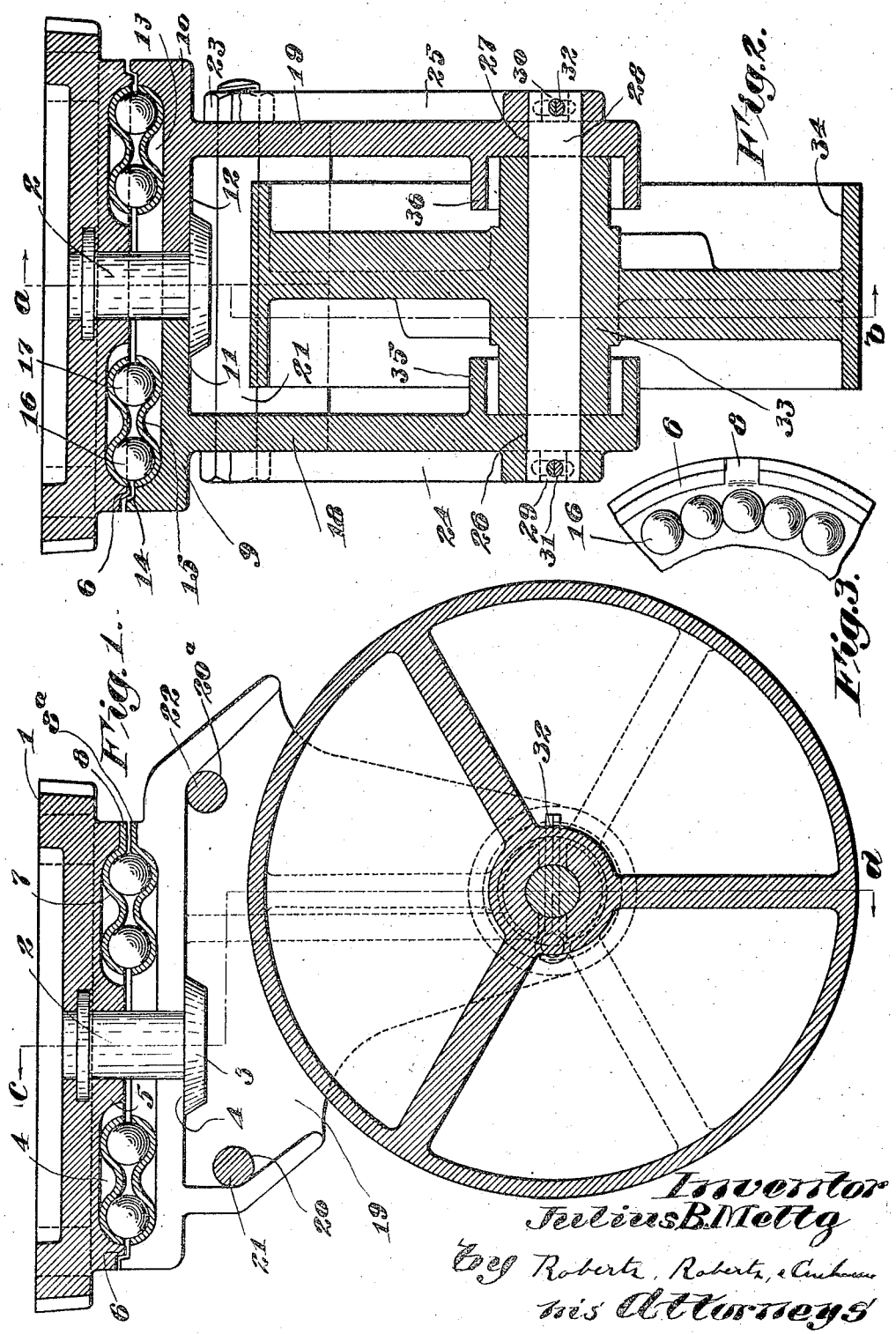
Inventor
Julius B. Meltz
By Roberts, Roberts, Cushman
his Attorneys Patented Feb. 13, 1923.

1,445,027

UNITED STATES PATENT OFFICE.

JULIUS B. MELTZ, OF EVERETT, MASSACHUSETTS.

CASTER.

Application filed June 27, 1921. Serial No. 480,766.

*To all whom it may concern:*

Be it known that I, JULIUS B. MELTZ, a citizen of the United States of America, and resident of Everett, in the county of Middlesex and State of Massachusetts, have invented new and useful Improvements in Casters, of which the following is a specification.

This invention relates to casters and more especially to that type of caster commonly employed in mills and other manufacturing establishments for supporting trucks, boxes, racks, etc., upon which material is transported from one part of the plant to another.

Such casters are subjected to very rough usage, are called upon to sustain heavy loads and must necessarily be of rugged and durable construction. It is also desirable that the parts be so designed as to permit of the free swivelling of the wheel support even when the caster is heavily loaded, and provision should be made for the ready replacement of the bearings between the moving parts when such bearings become worn in use.

As the swivelling axis of the caster is usually to one side of the axis of the wheel, the swivel connection is subjected to very heavy bending stresses and in order to withstand such stresses the connecting means employed should be as strong and rigid as it is possible to employ in the available space.

When casters are employed in textile mills and similar establishments where threads or fibres litter the floor, difficulty is commonly experienced by reason of the accumulation of such threads upon the journal of the caster wheel, thus preventing the free turning of the latter, and it is thus desirable to provide means for protecting the journal from such accumulation of foreign material.

The principal object of the present invention is to provide a caster having all of the desirable characteristics above referred to, and to this end the caster may comprise a base or attaching member carrying a centrally disposed swivel stud. The base member is preferably formed as a casting, the stud being cast or otherwise permanently fixed therein and having an integral head or radial flange at its free, lower extremity. The wheel supporting swivel member may be formed in two complementary parts each having a semi-circular opening loosely engageable about the swivel stud. The surface of the parts of the swivel member adjacent the edges of these openings may engage the under side of the swivel stud, whereby, upon connecting the two parts of the swivel member, as by means of bolts or the like, said members will be firmly retained against removal from the base member. As in such an arrangement the stud and its head are both fixed and immovable they will thus be enabled to resist relative lateral motion of the parts in a highly effective manner.

Interposed between the opposed surfaces of the base and swivel member may be one or more series of ball bearings and as such base and swivel will ordinarily be of cast iron, the ball races may comprise hardened rings of suitable material, such as sheet steel, seated in grooves or recesses in the opposed surfaces of the base and swivel member. The division of the latter into complemental and separable halves will thus conduce to ease of insertion of the bearing rings and facilitate their replacement when worn. Such rings might if desired be provided with lugs engaging recesses provided for the purpose in the base and swivel member respectively, whereby to prevent rotation of the rings in their grooves which, if permitted, would have a tendency to score and enlarge the latter.

The swivel member may have a pair of brackets outstanding therefrom, said brackets having aligned openings for a wheel supporting shaft, and each of the brackets may have an integral annular flange surrounding its opening and a cup-like cavity for the reception of the hub end. The provision of such a flange or its equivalent will thus in large manner overcome the trouble commonly occasioned by the catching of yarns or threads between the rotating hub and adjacent bracket with consequent binding of the parts. While particularly adapted for incorporation in a caster of the swivelling type, certain features of construction useful in carrying the above objects into effect may also prove of value in the construction of a stationary or non-swivelling type of caster and it is contemplated that the design of such a caster may fall within the scope of the present invention.

As one preferred embodiment of means whereby the object of the present invention may be effectuated that disclosed in the accompanying drawings may be employed and in which:—

Fig. 1 is a vertical cross section taken in a plane transversely of the axis of the wheel hub and through the pivotal axis of the swivel member of the caster, this section being taken on the line a—b of Fig. 2;

Fig. 2 is a vertical cross section on the line c—d of Fig. 1; and

Fig. 3 is a fragmentary bottom plan view of a portion of the supporting member or base, illustrating the mode of preventing the ball-race ring from rotating.

The base or supporting member is indicated at 1, this member preferably being of substantially circular form although the exact shape of this part is non-essential. This support or base may be provided with holes or slots for the reception of attaching bolts whereby the caster may be secured to the truck or rack to which it is desired to attach the same. Projecting downwardly from the center of the supporting member 1 is a stud 2 having a fixed radial flange 3 constituting a head therefor. This stud is fixedly secured in the support 1 and may be integral therewith if desired, it being preferred, however, to form this stud of relatively hard material and to cast it into the base member 1 when the latter is made. The head 3 of the stud 2 is provided with a substantially flat upper face indicated at 4, such face being spaced from the adjacent surface of the base member 1. An annular groove is formed in the lower surface of member 1 concentric with the stud 2, this groove being indicated at 4 and being defined by the central boss 5 and the annular flange 6. Within this groove is seated a ball-race ring 7 which is preferably formed of sheet material, such for example as steel which may be hardened by heat treatment to provide the desired wearing qualities. This ring is provided with one or more radially extending lugs 8, such lugs engaging within slots formed in the flange 6, as indicated in Fig. 3. Such lugs, when seated in the slots, serve to prevent rotation of the ring 7 relatively to the member 1.

Cooperating with the base member 1 is a swivel device comprising the complemental members 9, 10. These members are of substantially semi-circular form and are provided at their meeting edges with semi-circular notches for engagement about the stud 2. The lower surfaces of the members 9, 10 rest against the upper surface 4 of the head 3 of the stud. Members 9 and 10 are so formed as to provide a circular recess 13 at the upper side of the swivel device, the outer edge of such recess being defined by a flange 14 which overlaps the flange 6 and thus serves to protect the joint between the base member 1 and the swivel device. Within the groove 13 there is seated a ball-race ring 15 which is substantially identical in form with the ring 7, and may be provided with one or more radial lugs such as 8ª seated within corresponding slots in the flange 14. The rings 7 and 15, as herein shown, are provided with concentric annular grooves for the reception of ball bearings 16, 17, although it is contemplated that a greater or fewer number of such ball-holding grooves might be provided, if desired. Projecting downwardly from the members 9 and 10 respectively, are bracket arms 18, 19. These arms are furnished with aligned openings 20, 20ª for the reception of connecting bolts 21, 22, respectively. These bolts may be provided with nuts 23 whereby the bracket members 18, 19, with the members 9, 10, may be secured together. Extending downwardly at substantially the midportion of the respective brackets 18, 19 are outstanding ribs 24, 25.

Through the respective brackets and their ribs are formed aligned openings 26, 27 within which is mounted a shaft 28. Transverse slots 29, 30 are formed in the rib members 24, 25 such slots aligning with transverse openings in the ends of the shaft 28. Cotter pins 31, 32 are passed through such slots and through the openings in the shaft, and serve to prevent withdrawal of the shaft from the brackets as well as preventing rotation of the shaft therein, such cotter pins serving as additional means for holding the bracket members together.

Mounted to turn freely upon the shaft 28 is the hub 33 of a truck wheel 34. The ends of the wheel hub extend substantially into engagement with the inner faces of the bracket members 18, 19, respectively, and extending outwardly from such bracket members are annular flanges 35, 36, respectively, forming cup-like cavities within which the ends of the wheel hub are seated. The flanges 35, 36, as thus arranged, serve to cover and protect the joint between the ends of the wheel hub and the adjacent faces of the brackets, and thus prevent the accumulation of threads or other foreign material in such joint and which might interfere with the free rotation of the wheel. By forming the members 9, 10 as separate elements the operation of casting is facilitated and cheapened, while at the same time the employment of a fixed stud 2 is permitted. Such a stud is particularly advantageous in that there is no possibility of the parts becoming loose in use, as frequently happens when the pivot stud is retained by a nut or other removable securing means. At the same time, by forming such stud integrally with the base member or casting it into the same, there is no danger of its becoming loose and out of proper alignment when subjected to wear and hard usage. The use of the sheet metal race rings permits of the removal of the bearing surfaces when worn without necessitating the replacement of the entire casting. The provision of means for retaining the race rings against rotation is very desirable, as they might otherwise move relatively to the surfaces of the base member and swivel device to such an extent as to produce grooves therein having a tendency to throw the parts out of proper alignment.

Having thus described the invention in a preferred embodiment of the same, what I claim and desire to secure by Letters Patent of the United States is:

1. A caster having a base provided with attaching elements, a stud projecting from the under side of said base, said stud being immovably fixed in the base and having an integral head spaced from the lower side of the base, a swivel member comprising a pair of complemental parts of substantially semi-circular form, each part having a concentric semi-circular recess in its straight edge, said recesses cooperating to form a circular opening for the reception of the stud, anti-friction bearings interposed between the under side of the base and the upper surface of the swivel member, parallel bracket members carried by the respective swivel members, a shaft mounted in bearings in the respective bracket members, a wheel carried by the shaft and removable means normally acting to hold said brackets in operative parallel relationship.

2. A caster comprising a supporting member and a swivel member, means for pivotally connecting said members, independent ball-race rings interposed between said members, ball-bearings between said rings, and means for preventing relative movement between the ball-race rings and the respective members.

3. A caster having a supporting member and a swivel member, said members having opposed annular grooves, a ball race ring loosely seated in each of said grooves, balls interposed between said rings and means for preventing angular movement of rotation of said rings within their grooves.

4. A caster comprising a supporting member and a swivel member, said members having opposed grooves, the outer peripheries of said grooves being defined by annular flanges, each of said flanges having a plurality of radial recesses, a ball-race ring seated in each of said grooves, said rings each having lugs arranged within said recesses, and ball-bearings interposed between said rings.

5. A caster comprising a supporting member and a swivel member, each of said members having opposed annular grooves, each of said grooves having a radial recess in its outer wall, a ball-race ring of sheet-material loosely seated in each of said grooves, said rings each having an integral radial ear engaging the respective recesses, and bearings interposed between said rings.

6. A caster comprising a supporting member and a swivel member, means for swivelly connecting said members, and an anti-friction device interposed between said members, said device comprising a pair of rings provided respectively with annular grooves, the grooves of the two rings being opposed to each other whereby to form an annular channel, and a series of balls within the annular channel formed by the opposed grooves.

7. A caster comprising a wheel having a hub, a pair of spaced bracket members having aligned openings, a shaft mounted in said openings and supporting said wheel, and a cup-like socket integral with each of said brackets and serving for the reception of an end of the wheel hub.

8. A caster comprising a pair of independent members provided with openings, means for securing said members together with their openings in alignment, a shaft having its opposite ends mounted in the respective openings, a wheel mounted to turn upon said shaft, said wheel having a hub, and an annular flange integral with each of said brackets and concentric with the shaft, the respective flanges overlapping the end portions of the wheel hub.

9. A caster comprising a pair of spaced brackets, said brackets having aligned openings and slots extending transversely of the respective openings, a shaft mounted within said openings said shaft having transverse holes adjacent its ends, and members passing through said holes and lying within the respective slots whereby to maintain said shaft in fixed position.

Signed by me at Boston, Massachusetts, this 18th day of June, 1921.

JULIUS B. MELTZ.